(12) United States Patent
Panneer et al.

(10) Patent No.: US 9,563,643 B2
(45) Date of Patent: Feb. 7, 2017

(54) AUTOMATIC METATAGGING IN IMAGES

(71) Applicant: Intel Corporation, Santa Clara, CA (US)

(72) Inventors: Selvakumar Panneer, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,678

(22) Filed: Jun. 25, 2015

(65) Prior Publication Data
US 2016/0378788 A1    Dec. 29, 2016

(51) Int. Cl.
G06F 17/30    (2006.01)
G06K 9/00    (2006.01)
H04N 5/232    (2006.01)

(52) U.S. Cl.
CPC ..... *G06F 17/30247* (2013.01); *G06F 17/3028* (2013.01); *G06K 9/00288* (2013.01); *H04N 5/23245* (2013.01)

(58) Field of Classification Search
CPC ...................... G06F 17/30247; G06F 17/3028; G06F 21/32; G06F 21/00; G06F 21/31; G06F 3/017; G06F 17/30032; G06K 9/00288; G06K 9/00221; G06K 9/00255; G06K 9/00228; G06K 9/00885; G06K 9/00248; G06K 9/00892; G06K 9/00899; G06K 9/00604; H04N 5/23245; G07C 9/00158; H04L 63/0861; H04L 9/3231; G06Q 20/40145
See application file for complete search history.

(56) References Cited

U.S. PATENT DOCUMENTS

| | | | |
|---|---|---|---|
| 2008/0310686 A1 | 12/2008 | Kretz | |
| 2013/0015946 A1* | 1/2013 | Lau | G07C 9/00 340/5.2 |
| 2013/0222564 A1* | 8/2013 | Park | G06K 9/2027 348/77 |
| 2014/0044348 A1* | 2/2014 | Chen | G06K 9/00221 382/159 |
| 2014/0139667 A1 | 5/2014 | Kang | |

(Continued)

FOREIGN PATENT DOCUMENTS

KR    1020140106226 A    9/2014

OTHER PUBLICATIONS

"International Application Serial No. PCT/US2016/034131, International Search Report mailed Sep. 6, 2016", 3 pgs.

(Continued)

*Primary Examiner* — Edward Park
(74) *Attorney, Agent, or Firm* — Schwegman Lundberg & Woessner, P.A.

(57) ABSTRACT

Various systems and methods for implementing automatic image metatagging are described herein. A system for metatagging media content comprises a camera system; a user input module to receive user input from a user to capture media content via the camera system; a camera control module to: activate the camera system to capture a scene, and obtain an image with at least a portion of a face of the user; a user identification module to identify the user based on the image; and a metatagging module to tag the scene with the user as an author of the scene.

20 Claims, 4 Drawing Sheets

(56) References Cited

U.S. PATENT DOCUMENTS

| | | | |
|---|---|---|---|
| 2014/0197922 A1 | 7/2014 | Stanwood et al. | |
| 2014/0301612 A1* | 10/2014 | Cha | G06K 9/00677 |
| | | | 382/118 |
| 2015/0100578 A1 | 4/2015 | Rosen et al. | |
| 2015/0143492 A1* | 5/2015 | Berry | H04L 63/0861 |
| | | | 726/7 |
| 2015/0227609 A1* | 8/2015 | Shoemaker | G06K 9/00295 |
| | | | 707/737 |
| 2015/0237268 A1* | 8/2015 | Vaiaoga | H04N 5/265 |
| | | | 348/218.1 |

OTHER PUBLICATIONS

"International Application Serial No. PCT/US2016/034131, Written Opinion mailed Sep. 6, 2016", 9 pgs.

* cited by examiner

US 9,563,643 B2

AUTOMATIC METATAGGING IN IMAGES

TECHNICAL FIELD

Embodiments described herein generally relate to image analysis and in particular, to a system for automatic metatagging in images.

BACKGROUND

Smart phones and tablets may be used to capture images and videos. After an image or video is captured, the content may be uploaded to a social media platform. Metadata is data about the content. Some metadata may be obtained or determined and stored with the content at the time the content is captured (e.g., when the picture is taken). Other metadata may be manually added later with image archive software, for example.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system for automatic metatagging in images. Metatagging refers to the act of tagging an image or other content with metadata. Metadata is data about the content. Examples of metadata include, but are not limited to the date the content was captured (e.g., when was the image taken), the location the content was captured, a title, an author, a description, keywords, camera settings (e.g., exposure, shutter speed, f-stop, aperture, flash, etc.), and the like. Metadata may be stored with the content (e.g., in a certain area of an image file) or separate from the content.

When an image or video content is captured by a user device (e.g., smartphone), some metadata may be obtained and stored with the media file. Other types of user-generated content is also included in the scope of this disclosure, such as 3D files (e.g., 3D mesh). However, there are no systems that automatically capture and store the author of the content.

The present disclosure discusses an improvement to the operation of a digital camera system. Such camera systems may be incorporated into various user devices, such as mobile phones, tablets, personal digital assistants, laptops, digital cameras, and the like. The camera system includes at least two cameras—one forward facing (e.g., user facing) and one rear facing (e.g., world facing). When media content (e.g., an image of video) is captured using the rear facing camera, the front facing camera may be used to capture an image of the user so that the user may be identified and that identification then be associated with the content. The user device may then add the user identification to the media content as the "author" metadata.

Automatically identifying and tagging the author is useful, such as when a user captures media content and then wants to upload the content to a social media platform. By using an automated mechanism, the user no longer has to manually edit the content's metadata before pushing it to the social media platform. As such, the automatic mechanism streamlines the capture-to-sharing flow and makes it easier for a user to post and share media while ensuring that the author field is represented correctly. Also, once the author metadata field is set, searching and filtering on the field may be used to quickly find content created by a certain person. In addition, the automatic identification may be used in an automatic posting process flow. For example, the user may configure the user device to automatically post media content to a social media platform when the content is authored by the user and captured by the user device.

Figure 1:
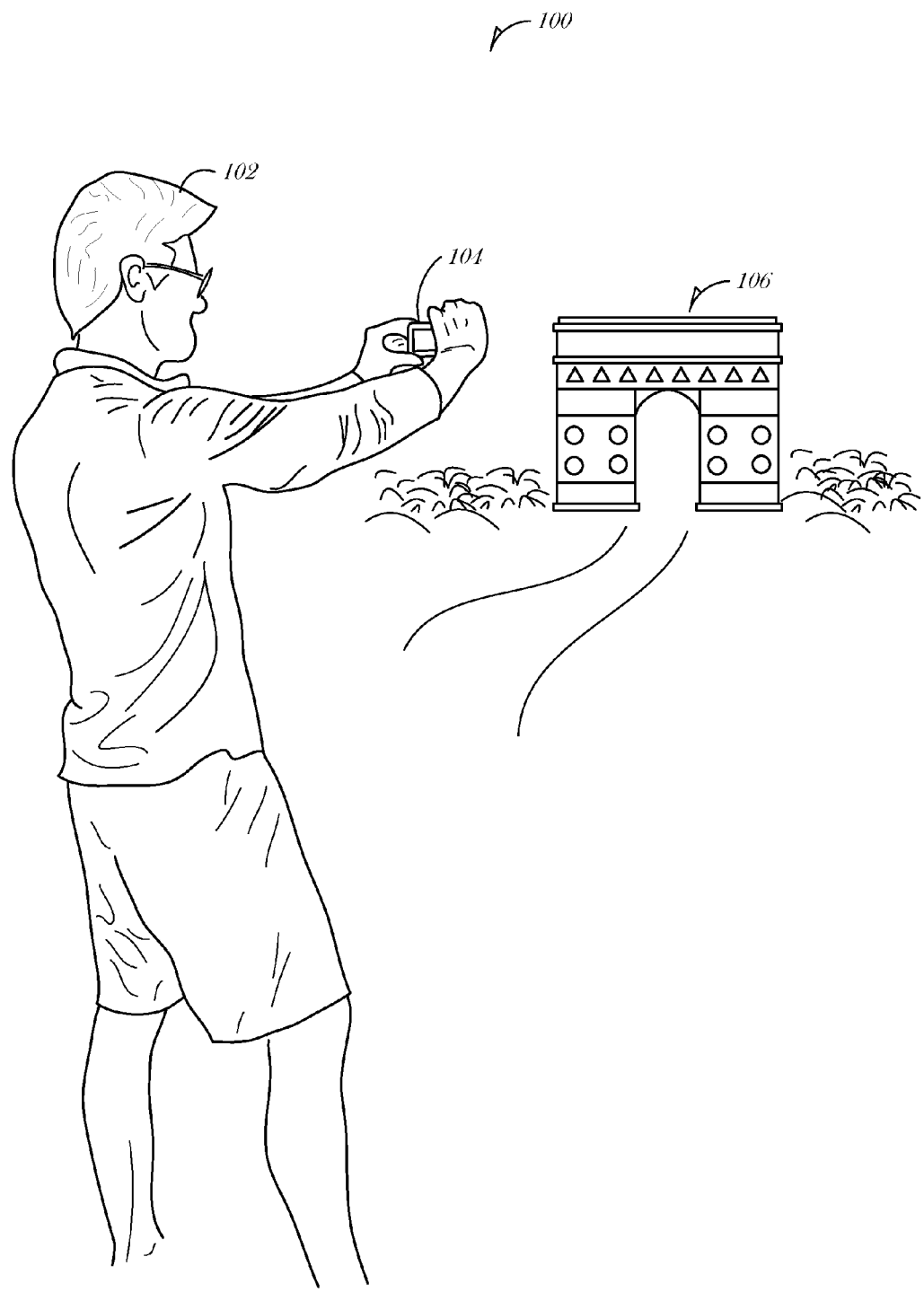
FIG. 1 is a diagram illustrating a user environment, according to an embodiment.

FIG. 1 is a diagram illustrating a user environment 100, according to an embodiment. FIG. 1 includes a user 102 and a user device 104. The user device 104 may be any type of compute device including, but not limited to a mobile phone, a smartphone, a phablet, a tablet, a personal digital assistant, a laptop, a digital camera, or the like. The user device 104 includes a front facing camera and a rear facing camera. The front facing camera (e.g., user facing camera) is often inferior to the rear facing camera (e.g., world facing camera). The front facing camera may also be referred to as a "selfie camera" in a mobile device or a "webcam" in a laptop. For example, where the rear facing camera may be a 20 MP (megapixel) camera with a maximum f-stop of f/2, the front facing camera may be a 5 MP with a maximum f-stop of f/4. As such, the rear facing camera will perform better in low light and have a higher resolution image output. The front facing camera would be sufficient for selfies, video conferencing, or other less intensive uses.

When the user 102 holds the user device 104 up to capture a photo or to take a video, the user device 104 activates both the front and rear facing cameras—the front facing camera to capture an image with the user's face and the rear facing camera to capture a scene 106 in the user environment 100. This is the situation when the user 102 uses the user device 104 in the conventional manner. Alternatively, the user device 104 may also support a "selfie" mode, where the front facing camera is the one that is used to capture the scene 106. In the selfie mode where there are at least two cameras (e.g., a user facing camera and a world facing camera), only the user facing camera is active. The user 102 may capture a picture of video of the user 102 while substantially simultaneously viewing the content being captured (e.g., on a screen of the user device 104). In the case of a selfie mode, the scene 106 is of the user 102 and the user's environment 100.

When media content is captured, either with the rear facing camera or the front facing camera when in selfie mode, an attempt to identify the user 102 is made. The front facing camera is used to capture one or more images with the expectation that the user 102 is included in at least one image. The images captured from the front facing camera are then analyzed to determine an identity of the user 102. The analysis may include various image analysis techniques for facial recognition. If more than one face is included in the image, additional analysis may be performed to identify a likely person who captured the image. For example, using spatial analysis, a person who is closer to the camera lens may be identified as the person who is more likely the person who captured the image or video. As another example, a person who is in the middle of the frame may be identified as the person more likely to be the author.

When image analysis alone is unable to identify a person, then additional operations may be performed. The user device 104 may display a prompt, such as for the user to select a face from multiple faces in an image to indicate the author of the media content. Additionally or alternatively, the user device 104 may display a prompt to have the author take another picture using the front facing camera to authenticate or identify the user 102. Such an operation may be useful when the initial image is blurred, obscured, difficult to analyze due to low light, fog, etc., or is otherwise difficult or impossible to analyze. The user device 104 may include other cameras or sensors to identify the user 102, such as an infrared camera, night vision camera, or the like. Images may be composited (e.g., a regular visible-light photograph and an infrared image taken at approximately the same time) in order to obtain more detail and identify a person in an image.

Once the author is identified, the media content is tagged. Tagging (or metatagging) the media content includes assigning or storing metadata with the media content. Various metadata standards may be used, such as the Information Interchange Model (IIM), which used International Press Telecommunications Council (IPTC) fields. Standards may include IPTC Core, IPTC Extension, and Extended Metadata Platform (XMP), for example. While some metadata standards are discussed here, it is understood that any name:value pairing mechanism or other data structure may be used to define and store metadata.

Tagged content may be automatically uploaded to a social media platform associate with the author. For example, the author's FACEBOOK® account may be accessed and an image captured by the author may be posted to the FACEBOOK® account with the tagged information. If the author is not the owner of the device, then automatic posting may be disabled. This mechanism may provide protection against pranks, malicious activities, or fraudulent activities (e.g., where a person takes a picture and the picture is uploaded automatically to another person's social media account).

Figure 2:
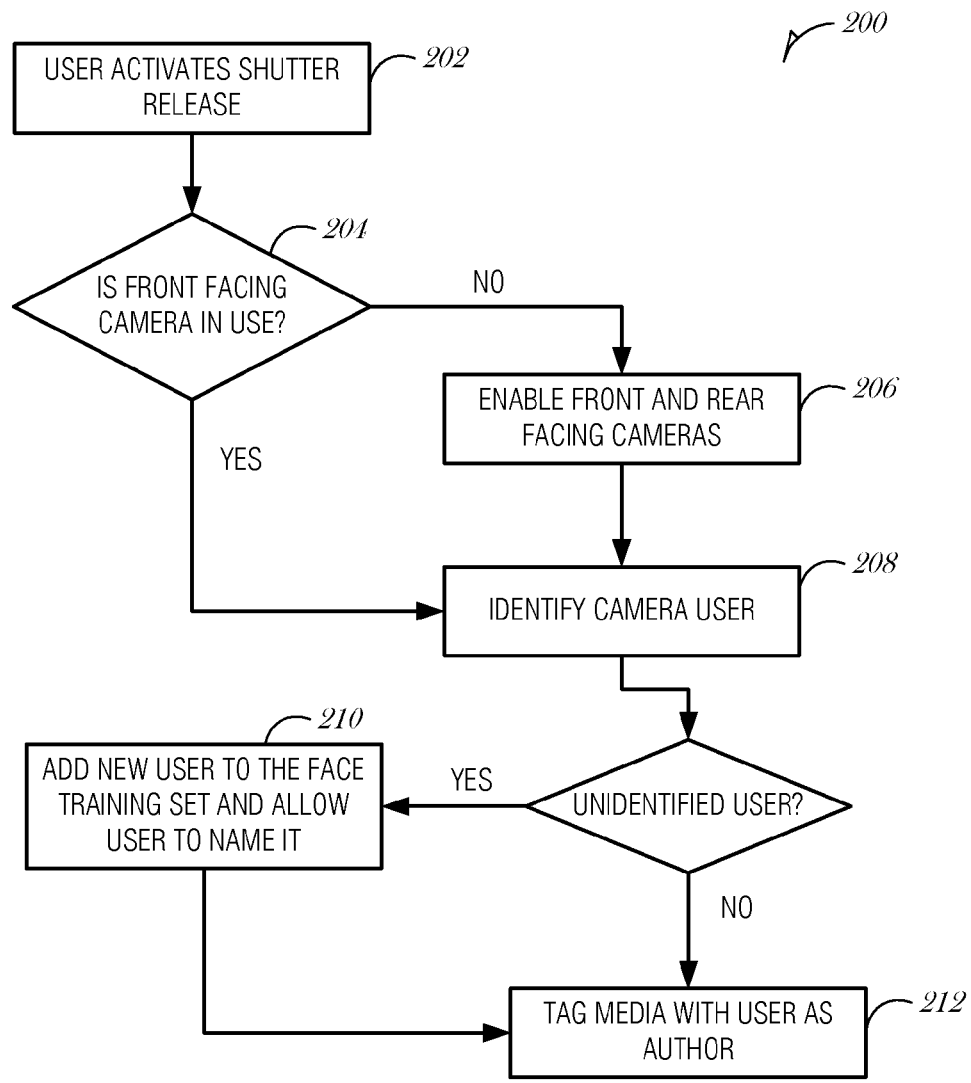
FIG. 2 is a flowchart illustrating control and data flow during operation, according to an embodiment.

FIG. 2 is a flowchart illustrating control and data flow during operation, according to an embodiment. At 202, a user activates the camera shutter release control to take a picture or begin recording a video. The shutter release control may be a hard or soft control (e.g., a physical button or a software control). At decision block 204, it is determined whether the front facing (user facing) camera is in use (e.g., selfie mode). When the front facing camera is not in use, then at operation 206 the front facing camera is activated to capture a picture of the user (person capturing the image). This may be performed simultaneously when the user is capturing an image of the scene in front of the user using the rear (e.g., world) facing camera. Alternatively, when the front facing camera is the one being used to capture the image, then the rear facing camera (world facing camera) is not activated. The facial detection and recognition processes are executed on the image captured by the front facing camera in order to identify the user (operation 208). If a face is identified but not recognized, then at operation 210 the user is prompted to associate an identity with the face. For example, the image may be presented with a box or other indicia outlining one or more faces. Each face may be associated with an identity, which trains the camera system in future cases. Alternatively, if a face is recognized then control is passed to operation 212 where the identity associated with the recognized face is used as the author of the media.

Figure 3:
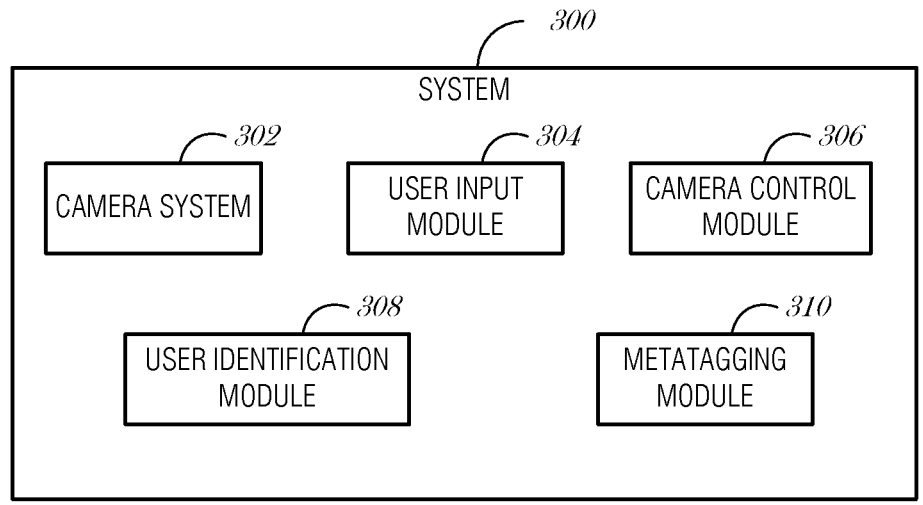
FIG. 3 is a block diagram illustrating a system for metatagging media content, according to an embodiment.

FIG. 3 is a block diagram illustrating a system 300 for metatagging media content, according to an embodiment. The system 300 includes a camera system 302, a user input module 304, a camera control module 306, a user identification module 308, and a metatagging module 310. The user input module 304 may be configured to receive user input from a user to capture media content via the camera system. The camera control module 306 may be configured to activate the camera system 302 to capture a scene. The camera control module 306 may further obtain an image with at least a portion of a face of the user. The user identification module 308 may be configured to identify the user based on the image. The metatagging module 310 may be configured to tag the scene with the user as an author of the scene.

In an embodiment, the camera system 302 comprises a user facing camera and a world facing camera. In such an embodiment, the image with the face of the user is captured using the user facing camera, and the scene is captured using the world facing camera.

In an embodiment, to tag the scene, the metatagging module 310 is to set a metadata tag of the scene. In a further embodiment, the metadata tag is an author field. The metatagging module 310 may user pre-existing metadata fields to tag the scene. Alternatively, the metatagging module 310 may set arbitrary fields to tag the scene, such as by defining new name:value pairs or reusing existing pairs that were defined for a different purpose to store the author.

In an embodiment, the camera system 302 comprises a user facing camera and a world facing camera, and the camera control module 306 is to determine that the camera system 302 is in a selfie mode, and when the camera system 302 is in the selfie mode, obtain the image by capturing the image from the user facing camera.

In an embodiment, to identify the user based on the image, the user identification module 308 is to attempt to identify the user based on image recognition and when the attempt to identify the user based on image recognition fails, prompt the user for another attempt. In a further embodiment, to prompt the user for another attempt, the user identification module 308 is to prompt the user to position the face in a field of view of the user facing camera. For example, the user may be prompted to move into a "live view" of the front facing camera and position his head in a manner to allow the front facing camera to capture an image with his face in order to identify the user. In an embodiment, to prompt the user for another attempt, the user identification module 308 is to prompt the user to confirm a user identification. In such an embodiment, the user may be simply prompted with a user interface control (e.g., text box, radio buttons, confirmation message, or the like) to confirm or provide an identity of the face found in the image.

In an embodiment, the system 300 includes an upload module to upload the scene to a social media platform. In a further embodiment, to upload the scene, the upload module is to confirm that the system 300 belongs to the user and based on the confirming, upload the scene. Ownership may be confirmed in various manners, such as by checking the currently logged in user, analyzing who the system 300 is registered to, or the like. In a further embodiment, uploading the scene is performed automatically after the scene is captured. The user may configure the system 300 to upload some or all of the media captured based on various preferences (e.g., only during a certain time of day, when the content is less than a certain size, or only when a high-speed wireless connection is available).

In an embodiment, the camera system 302 comprises an infrared camera. Images produced with the infrared camera may be used independently or in combination with images produced by a visible light camera to assist in facial detection or recognition. Other systems may be used in conjunction with conventional image analysis as obtained from a visible light camera, such as depth cameras that use structured light, time of flight, or Lidar to detect or identify the author.

Figure 4:
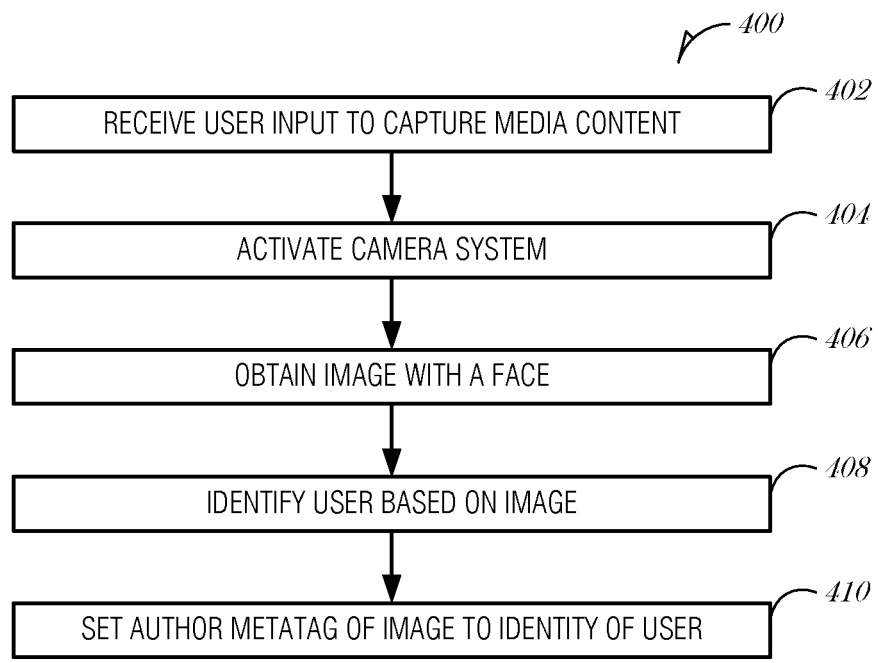
FIG. 4 is a flowchart illustrating a method of metatagging media content, according to an embodiment.

FIG. 4 is a flowchart illustrating a method 400 of metatagging media content, according to an embodiment. At block 402, user input is received at a user device from a user to capture media content, the compute device including a camera system.

At block 404, the camera system is activated to capture a scene. This may involve activating one or more cameras in the camera system. For example, when in selfie mode, only one camera is activated (the user facing camera). When in conventional mode, the world facing camera is activated to capture the scene and the user facing camera is activated to capture a picture of the user to be used for obtaining the user's identity and tagging the media with the user as the author.

At block 406, an image is obtained with at least a portion of a face of the user. The image may be obtained from a video stream when the camera system is being used to record a video. Multiple images may be obtained to increase the odds of having an image with a recognizable face. For example, three images may be obtained in a relatively quick succession (e.g., less than 0.5 seconds) to be used for facial detection and recognition. The image may be obtained at approximately the same time as the scene (e.g., using two cameras). The image may be accessed from storage, where the image was captured and stored prior to the capturing of the scene (block 404). For example, when a user begin operation of a camera, a picture may be taken of the user with the user facing camera. Later when the user captures a scene with a world facing camera (e.g., image or video), the image of the user may be accessed and analyzed.

At block 408, the user is identified based on the image. In an embodiment, identifying the user based on the image comprises attempting to identify the user based on image recognition and when the attempt to identify the user based on image recognition fails, prompting the user for another attempt.

In an embodiment, prompting the user for another attempt comprises prompting the user to position the face in a field of view of the user facing camera. In an embodiment, prompting the user for another attempt comprises prompting the user to confirm a user identification.

In an embodiment, the camera system comprises an infrared camera to capture an infrared image. In such an embodiment, the user may be identified based at least in part on the infrared image.

At block 410, the scene is tagged with the user as an author of the scene. In an embodiment, tagging the scene comprises setting a metadata tag of the scene. In a further embodiment, the metadata tag is an author field.

In an embodiment, the camera system comprises a user facing camera and a world facing camera. In a further embodiment, the image with the face of the user is captured using the user facing camera, and the scene is captured using the world facing camera.

In an embodiment, the camera system comprises a user facing camera and a world facing camera, and the method 400 further comprises determining that the camera system is in a selfie mode and when the camera system is in the selfie mode, obtaining the image by capturing the image from the user facing camera.

In an embodiment, the method 400 includes uploading the scene to a social media platform. In a further embodiment, uploading the scene comprises confirming that the user device belongs to the user and based on the confirming, uploading the scene. In an embodiment, uploading the scene is performed automatically after the scene is captured.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
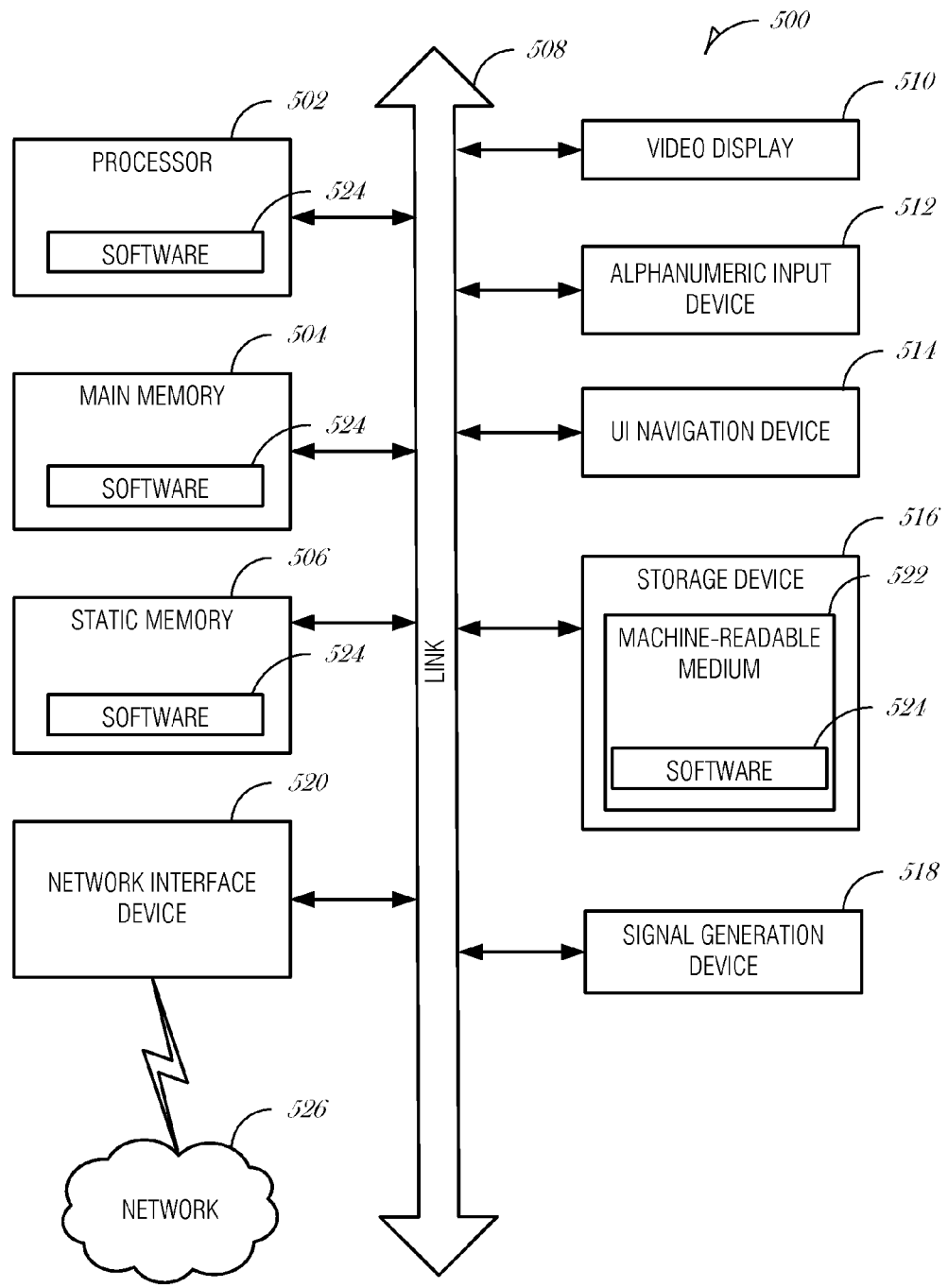
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for metatagging media content (such as a device, apparatus, or machine) comprising: a camera system; a user input module to receive user input from a user to capture media content via the camera system; a camera control module to activate the camera system to: capture a scene, and obtain an image with at least a portion of a face of the user; a user identification module to identify the user based on the image; and a metatagging module to tag the scene with the user as an author of the scene.

In Example 2, the subject matter of Example 1 may include, wherein the camera system comprises a user facing camera and a world facing camera.

In Example 3, the subject matter of any one of Examples 1 to 2 may include, wherein the image with the face of the user is captured using the user facing camera, and wherein the scene is captured using the world facing camera.

In Example 4, the subject matter of any one of Examples 1 to 3 may include, wherein to tag the scene, the metatagging module is to set a metadata tag of the scene.

In Example 5, the subject matter of any one of Examples 1 to 4 may include, wherein the metadata tag is an author field.

In Example 6, the subject matter of any one of Examples 1 to 5 may include, wherein the camera system comprises a user facing camera and a world facing camera, and wherein the camera control module is to: determine that the camera system is in a selfie mode, and when the camera system is in the selfie mode, obtain the image by capturing the image from the user facing camera.

In Example 7, the subject matter of any one of Examples 1 to 6 may include, wherein to identify the user based on the image, the user identification module is to: attempt to identify the user based on image recognition; and when the attempt to identify the user based on image recognition fails, prompt the user for another attempt.

In Example 8, the subject matter of any one of Examples 1 to 7 may include, wherein to prompt the user for another attempt, the user identification module is to prompt the user to position the face in a field of view of the user facing camera.

In Example 9, the subject matter of any one of Examples 1 to 8 may include, wherein to prompt the user for another attempt, the user identification module is to prompt the user to confirm a user identification.

In Example 10, the subject matter of any one of Examples 1 to 9 may include, an upload module to upload the scene to a social media platform.

In Example 11, the subject matter of any one of Examples 1 to 10 may include, wherein to upload the scene, the upload module is to: confirm that the system belongs to the user; and based on the confirming, upload the scene.

In Example 12, the subject matter of any one of Examples 1 to 11 may include, wherein uploading the scene is performed automatically after the scene is captured.

In Example 13, the subject matter of any one of Examples 1 to 12 may include, wherein the camera system comprises an infrared camera to capture an infrared image, and wherein to identify the user based on the image, the user identification module is to use the infrared image to identify the user.

Example 14 includes subject matter for metatagging media content (such as a method, means for performing acts, machine readable medium including instructions that when performed by a machine cause the machine to performs acts, or an apparatus to perform) comprising: receiving, at a user device, user input from a user to capture media content, the compute device including a camera system; activating the camera system to capture a scene; obtaining an image with at least a portion of a face of the user; identifying the user based on the image; and tagging the scene with the user as an author of the scene.

In Example 15, the subject matter of Example 14 may include, wherein the camera system comprises a user facing camera and a world facing camera.

In Example 16, the subject matter of any one of Examples 14 to 15 may include, wherein the image with the face of the user is captured using the user facing camera, and wherein the scene is captured using the world facing camera.

In Example 17, the subject matter of any one of Examples 14 to 16 may include, wherein tagging the scene comprises setting a metadata tag of the scene.

In Example 18, the subject matter of any one of Examples 14 to 17 may include, wherein the metadata tag is an author field.

In Example 19, the subject matter of any one of Examples 14 to 18 may include, wherein the camera system comprises a user facing camera and a world facing camera, and wherein the method further comprises: determining that the camera system is in a selfie mode, and when the camera system is in the selfie mode, obtaining the image by capturing the image from the user facing camera.

In Example 20, the subject matter of any one of Examples 14 to 19 may include, wherein identifying the user based on the image comprises: attempting to identify the user based on image recognition; and when the attempt to identify the user based on image recognition fails, prompting the user for another attempt.

In Example 21, the subject matter of any one of Examples 14 to 20 may include, wherein prompting the user for another attempt comprises prompting the user to position the face in a field of view of the user facing camera.

In Example 22, the subject matter of any one of Examples 14 to 21 may include, wherein prompting the user for another attempt comprises prompting the user to confirm a user identification.

In Example 23, the subject matter of any one of Examples 14 to 22 may include, uploading the scene to a social media platform.

In Example 24, the subject matter of any one of Examples 14 to 23 may include, wherein uploading the scene comprises: confirming that the user device belongs to the user; and based on the confirming, uploading the scene.

In Example 25, the subject matter of any one of Examples 14 to 24 may include, wherein uploading the scene is performed automatically after the scene is captured.

In Example 26, the subject matter of any one of Examples 14 to 25 may include, wherein the camera system comprises an infrared camera to capture an infrared image, and wherein identifying the user based on the image comprise using the infrared image to identify the user.

Example 27 includes at least one machine-readable medium including instructions, which when executed by a machine, cause the machine to perform operations of any of the Examples 14-26.

Example 28 includes an apparatus comprising means for performing any of the Examples 14-26.

Example 29 includes subject matter for metatagging media content (such as a device, apparatus, or machine) comprising: means for receiving, at a user device, user input from a user to capture media content, the compute device including a camera system; means for activating the camera system to capture a scene; means for obtaining an image with at least a portion of a face of the user; means for identifying the user based on the image; and means for tagging the scene with the user as an author of the scene.

In Example 20, the subject matter of any one of Examples 29 to 19 may include, wherein the camera system comprises a user facing camera and a world facing camera.

In Example 31, the subject matter of any one of Examples 29 to 30 may include, wherein the image with the face of the user is captured using the user facing camera, and wherein the scene is captured using the world facing camera.

In Example 32, the subject matter of any one of Examples 29 to 31 may include, wherein the means for tagging the scene comprise means for setting a metadata tag of the scene.

In Example 33, the subject matter of any one of Examples 29 to 32 may include, wherein the metadata tag is an author field.

In Example 34, the subject matter of any one of Examples 29 to 33 may include, wherein the camera system comprises a user facing camera and a world facing camera, and wherein the apparatus further comprises: means for determining that the camera system is in a selfie mode, and means for when the camera system is in the selfie mode, obtaining the image by capturing the image from the user facing camera.

In Example 35, the subject matter of any one of Examples 29 to 34 may include, wherein the means for identifying the user based on the image comprise: means for attempting to identify the user based on image recognition; and means for when the attempt to identify the user based on image recognition fails, prompting the user for another attempt.

In Example 36, the subject matter of any one of Examples 29 to 35 may include, wherein the means for prompting the user for another attempt comprise means for prompting the user to position the face in a field of view of the user facing camera.

In Example 37, the subject matter of any one of Examples 29 to 36 may include, wherein the means for prompting the user for another attempt comprise means for prompting the user to confirm a user identification.

In Example 38, the subject matter of any one of Examples 29 to 37 may include, means for uploading the scene to a social media platform.

In Example 39, the subject matter of any one of Examples 29 to 38 may include, wherein the means for uploading the scene comprise: means for confirming that the user device belongs to the user; and means for based on the confirming, uploading the scene.

In Example 40, the subject matter of any one of Examples 29 to 39 may include, wherein the means for uploading the scene is performed automatically after the scene is captured.

In Example 41, the subject matter of any one of Examples 29 to 40 may include, wherein the camera system comprises an infrared camera to capture an infrared image, and wherein the means for identifying the user based on the image comprise means for using the infrared image to identify the user.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for metatagging media content, the system comprising:
    a camera system;
    a user input circuit to receive user input from a user of the camera system to capture media content via the camera system;
    a camera control circuit to activate the camera system to:
        obtain a first image that captures a scene;
        obtain a second image that captures at least a portion of a face of the user of the camera system and at least a portion of another face of another person near the user, wherein the second image is obtained from among a plurality of images captured by the camera control circuit, and wherein the second image is selected from among the plurality of images in response to a determination that the at least a portion of the face of the user of the camera system is captured in the second image; and
        analyze the second image to determine the user as the one who is more likely to be the author between the user and the person near the user, based on spatial analysis of a position of the face of the user with respect to the face of the other person near the user;
    a user identification circuit to identify the user of the camera system based on the second image; and
    a metatagging circuit to tag the first image to identify the user of the camera system as an author of the first image.

2. The system of claim 1, wherein the camera system comprises a user facing camera and a world facing camera, and wherein the camera control circuit is to:
    determine that the camera system is in a selfie mode, and when the camera system is in the selfie mode, obtain the first image and the second image by operations that capture the first image and the second image from the user facing camera.

3. The system of claim 1, wherein to identify the user of the camera system based on the second image, the user identification circuit is to:
    attempt to identify the user of the camera system based on image recognition performed upon the second image; and
    when the attempt to identify the user of the camera system based on image recognition fails, prompt the user of the camera system for another attempt.

4. The system of claim 3, wherein to prompt the user of the camera system for another attempt, the user identification circuit is to prompt the user of the camera system to position the face in a field of view of the user facing camera.

5. The system of claim 3, wherein to prompt the user of the camera system for another attempt, the user identification circuit is to prompt the user of the camera system to confirm a user identification.

6. The system of claim 1, further comprising an upload circuit to upload the first image to a social media platform, the first image including metadata within the first image that identifies the user of the camera system as an author of the first image.

7. The system of claim 6, wherein to upload the scene, the upload circuit is to:
confirm that the system belongs to the user of the camera system; and
based on the confirming, upload the first image.

8. The system of claim 6, wherein uploading the first image is performed automatically after the scene is captured.

9. The system of claim 1, wherein the camera system comprises an infrared camera to capture an infrared image as the second image, and wherein to identify the user of the camera system based on the second image, the user identification circuit is to use the infrared image to identify the user of the camera system.

10. A method of metatagging media content, the method comprising:
receiving, at a user device, user input from a user of a camera system to capture media content, the user device including the camera system;
activating the camera system to capture a first image producing a scene;
obtaining a second image that captures at least a portion of a face of the user of the camera system and at least a portion of another face of another person near the user, wherein the second image is obtained from among a plurality of images captured by the user device, and wherein the second image is selected from among the plurality of images in response to a determination that the at least a portion of the face of the user of the camera system is captured in the second image;
analyzing the second image to determine the user as the one who is more likely to be the author between the user and the person near the user, based on spatial analysis of a position of the face of the user with respect to the face of the other person near the user;
identifying the user of the camera system based on the second image; and
tagging the first image to identify the user of the camera system as an author of the first image.

11. The method of claim 10, wherein tagging the scene comprises setting a metadata tag of the first image.

12. The method of claim 11, wherein the metadata tag is an author field.

13. The method of claim 10, wherein the camera system comprises a user facing camera and a world facing camera, and wherein the method further comprises:
determining that the camera system is in a selfie mode, and when the camera system is in the selfie mode, obtaining the first image by capturing the first image and the second image from the user facing camera.

14. The method of claim 10, wherein identifying the user of the camera system based on the second image comprises:
attempting to identify the user of the camera system based on image recognition performed upon the second image; and
when the attempt to identify the user of the camera system based on image recognition fails, prompting the user of the camera system for another attempt.

15. The method of claim 14, wherein prompting the user of the camera system for another attempt comprises prompting the user of the camera system to position the face in a field of view of the user facing camera.

16. The method of claim 14, wherein prompting the user of the camera system for another attempt comprises prompting the user of the camera system to confirm a user identification.

17. At least one non-transitory machine-readable medium including instructions, which when executed by a machine, cause the machine to:
receive user input from a user of a camera system to capture media content via the camera system;
activate the camera system to capture a first image producing a scene;
obtain a second image that captures at least a portion of a face of the user of the camera system and at least a portion of another face of another person near the user, wherein the second image is obtained from among a plurality of images captured by the user device, and wherein the second image is selected from among the plurality of images in response to a determination that the at least a portion of the face of the user of the camera system is captured in the second image;
analyze the second image to determine the user as the one who is more likely to be the author between the user and the person near the user, based on spatial analysis of a position of the face of the user with respect to the face of the other person near the user;
identify the user of the camera system based on the second image; and
tag the first image to identify the user of the camera system as an author of the first image.

18. The at least one non-transitory machine-readable medium of claim 17, wherein the camera system comprises a user facing camera and a world facing camera, and wherein the instructions include instructions to:
determine that the camera system is in a selfie mode, and when the camera system is in the selfie mode, obtain the first image by capturing the first image and the second image from the user facing camera.

19. The at least one non-transitory machine-readable medium of claim 17, wherein the instructions to identify the user based on the second image include instructions to:
attempt to identify the user of the camera system based on image recognition performed upon the second image; and
when the attempt to identify the user of the camera system based on image recognition fails, prompt the user of the camera system for another attempt.

20. The at least one non-transitory machine-readable medium of claim 17, wherein the camera system comprises an infrared camera to capture an infrared image as the second image, and wherein the instructions to identify the user of the camera system based on the second image include instructions to use the infrared image to identify the user of the camera system.

\* \* \* \* \*